US007931192B1

(12) United States Patent
Pouncey

(10) Patent No.: US 7,931,192 B1
(45) Date of Patent: Apr. 26, 2011

(54) APPARATUS FOR ASSISTANCE IN READING INFORMATION FROM IDENTIFICATION CARDS

(75) Inventor: Kim Emery Pouncey, Louisville, TN (US)

(73) Assignee: Straight UP, LLC, Knoxville, TN (US)

( * ) Notice: Subject to any disclaimer, the term of this patent is extended or adjusted under 35 U.S.C. 154(b) by 0 days.

(21) Appl. No.: 12/755,112

(22) Filed: Apr. 6, 2010

Related U.S. Application Data

(60) Provisional application No. 61/225,711, filed on Jul. 15, 2009.

(51) Int. Cl.
*G06K 5/00* (2006.01)

(52) U.S. Cl. ....... 235/375; 40/424.06; 40/661; 353/122; 283/81

(58) Field of Classification Search .................. 235/375; 40/424.06, 661; 353/122; 283/81
See application file for complete search history.

(56) References Cited

U.S. PATENT DOCUMENTS 4,695,077 A * 9/1987 Pretre ............................ 283/81
5,209,514 A * 5/1993 Hebert ............................ 283/81
5,428,417 A * 6/1995 Lichtenstein ................ 353/122
2004/0231216 A1* 11/2004 Lundberg ....................... 40/661
2007/0094901 A1* 5/2007 Kibbe et al. ............... 40/124.06

* cited by examiner

*Primary Examiner* — Allyson N Trail
(74) *Attorney, Agent, or Firm* — Luedeka, Neely & Graham, P.C.

(57) ABSTRACT

An identification assistance card system is disclosed for assisting in obtaining identification information from an identification card having an identification card shape. The identification assistance card system includes an identification assistance card having an assistance card shape based at least in part on the identification card shape of the identification card. An identification information window is disposed in the identification assistance card for displaying the identification information from the identification card when the identification assistance card is substantially aligned with the identification card. The identification information window is disposed in the identification assistance card at a location based at least in part on where the identification information is disposed on the identification card.

15 Claims, 4 Drawing Sheets

APPARATUS FOR ASSISTANCE IN READING INFORMATION FROM IDENTIFICATION CARDS

CROSS-REFERENCE TO RELATED APPLICATION

This application claims priority to provisional application No. 61/225,711 filed Jul. 15, 2009 entitled Apparatus for Assistance in Reading Information from Identification Cards, the entire contents being incorporated herein by reference.

FIELD

This invention relates to the field of identification cards. More particularly, this invention relates to an apparatus for assisting one checking identification cards to focus on the most relevant information.

BACKGROUND

Employees and identification checkers encounter numerous distractions and pressures while determining whether a particular customer requesting purchase of alcohol or tobacco products is of the legal age for doing so. Other situations in which employees or law enforcement officials check identification cards to determine that a holder of the identification card is of proper age to perform a particular activity include bouncers at a night club checking to make sure someone is allowed to enter the establishment or movie vendors checking to make sure a patron's are of the required age to see films having particular ratings. For this and other reasons, a tool aiding in checking a patron's identification for authenticity and appropriate age is needed.

SUMMARY

Embodiments of the invention described herein pertain to an identification assistance card that focuses a person's attention on areas of specific interest when reading and analyzing information from an identification card such as a driver's license. In one embodiment of the invention, an identification assistance card system is disclosed for assisting in obtaining identification information from an identification card having an identification card shape. The identification assistance card system includes an identification assistance card having an assistance card shape based at least in part on the identification card shape of the identification card. An identification information window is disposed in the identification assistance card for displaying the identification information from the identification card when the identification assistance card is substantially aligned with the identification card. The identification information window is disposed in the identification assistance card at a location based at least in part on where the identification information is disposed on the identification card.

According to some embodiments of the invention, the identification information includes a birth date of a holder of the identification card and the identification assistance card includes an age reminder disposed on the assistance card adjacent the identification information window for assisting in identifying a latest birth date for which the holder of the identification card is allowed to perform an activity. In some embodiments of the invention, the activity performed includes purchasing at least one of alcohol and tobacco. The identification assistance card system may include a plurality of identification assistance cards each representing identification cards issued by at least one of a plurality of states. The plurality of identification assistance cards each include the identification information window being disposed in the identification assistance card at the location based at least in part on where the identification information is disposed on identification cards issued by at least one of the plurality of states.

The identification assistance card may also include a second identification information window disposed in the identification assistance card for displaying the identification information from the identification card, the second identification information window being disposed in the identification assistance card at a second location based at least in part on where the identification information displayed by the second identification information window is disposed on the identification card. In some embodiments, the identification assistance card includes a first identification information window and a second identification information window and the identification information includes a birth date of a holder of the identification card and an expiration date of the identification card, and the first identification information window displays the birth date of the holder of the identification card and the second information window displays the expiration date of the identification card. In other embodiments, the identification information includes a birth date of a holder of the identification card and a duplicate indicator identifying whether the identification card is a duplicate, and the first identification information window displays the birth date of the holder of the identification card and the second information window displays the duplicate indicator.

In another embodiment of the invention, an identification assistance card system is disclosed for assisting in obtaining identification information including a birth date of a holder of an identification card having an identification card shape. The identification assistance card system includes a plurality of identification assistance cards each representing the identification card issued by at least one of a plurality of states. The plurality of identification assistance cards each include an assistance card shape based at least in part on the identification card shape of the identification card that the identification assistance card represents. An identification information window is disposed in each of the plurality of identification assistance cards for displaying the birth date of the holder of the identification card when the identification assistance card is substantially aligned with the identification card that the assistance card represents. An age reminder is disposed on each of the plurality of identification assistance cards adjacent the identification information window for assisting in identifying a latest birth date for which the holder of the identification card is allowed to purchase at least one of alcohol and tobacco.

The identification information may include at least one of an expiration date of the identification card, a duplicate indicator identifying whether the identification card is a duplicate, and an underage identifier. In this embodiment, the identification assistance card includes a second identification information window disposed in each of the plurality of identification assistance cards for displaying at least one of the expiration date, the duplicate indicator, and the underage identifier from the identification card.

According to yet another embodiment of the invention, a method is disclosed for determining whether a holder of an identification card having identification information and an identification card shape is allowed to perform an activity. The method includes the following steps: providing an identification assistance card having an assistance card shape based at least in part on the identification card shape of the identification card and an identification information window disposed in the identification assistance card for displaying the identification information, the identification information window being disposed in the identification assistance card at a location based at least in part on where the identification information is disposed on the identification card; aligning the identification assistance card with the identification card so that the identification information window displays the identification information from the identification card; and obtaining the identification information displayed in the identification information window to determine whether the holder of the identification card is allowed to perform the activity.

According to some embodiments, the identification information includes a birth date of the holder of the identification card and the activity includes purchasing at least one of alcohol and tobacco. The method may also include providing a plurality of identification assistance cards each representing identification cards issued by at least one of a plurality of states and wherein the identification information window of each of the plurality of identification assistance cards is disposed in the identification assistance card at the location based at least in part on where the identification information is disposed on identification cards issued by one of the plurality of states; and choosing an appropriate identification assistance card from the plurality of identification assistance cards based at least in part on which state issued the identification card of the holder.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
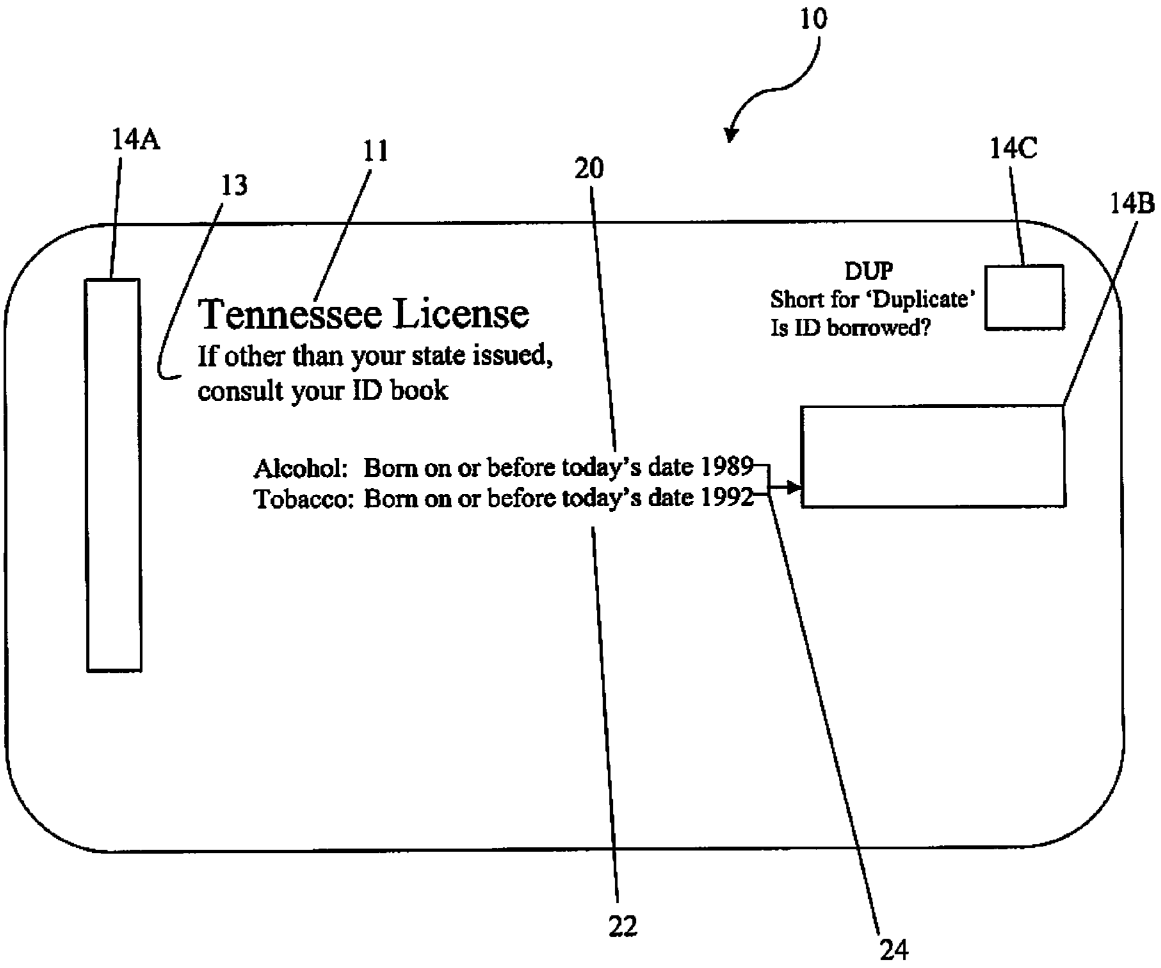
FIG. 1 is a front view of an identification assistance card according to one embodiment of the invention.
Figure 2:
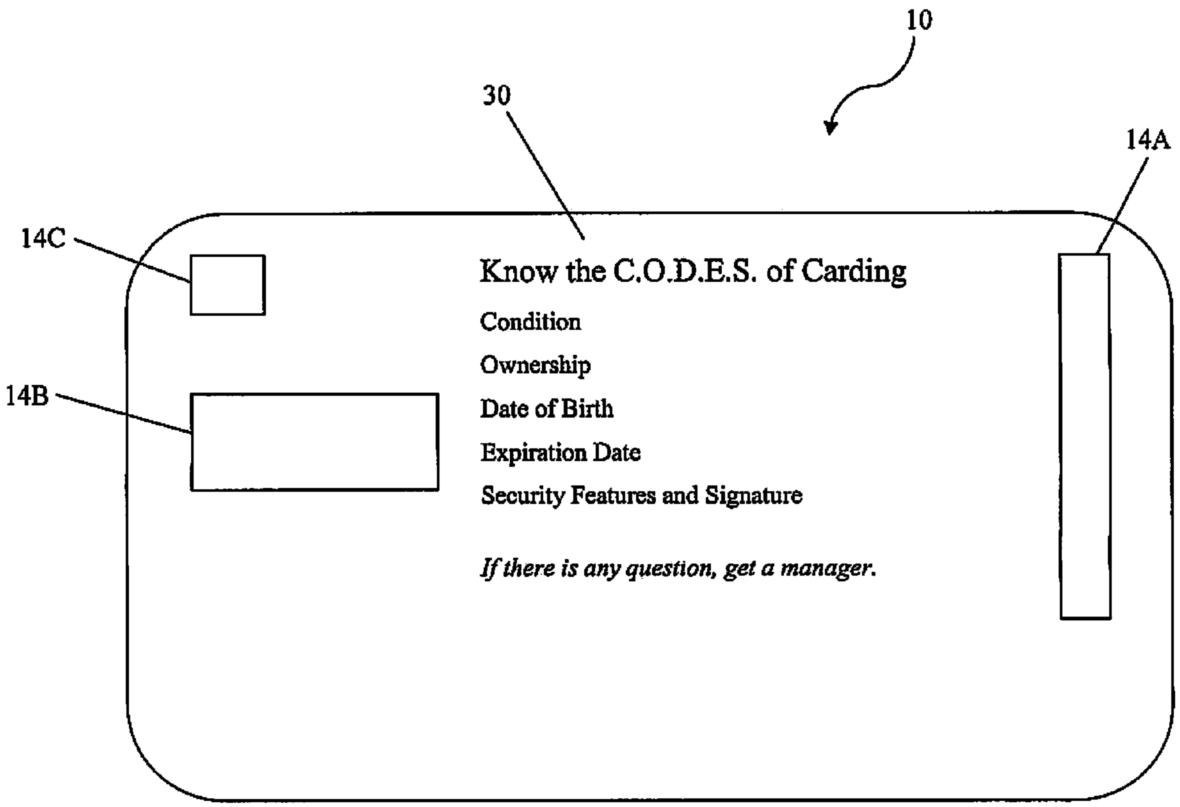
FIG. 2 is a back view of an identification assistance card according to one embodiment of the invention.

Referring to FIGS. 1 and 2, an identification assistance card 10 is shown. A state identifier 11, or any other identifier 11 that identifies the entity that issued the identification assistance card 10, is printed in a prominent location on the assistance card 10 so that the person checking the identification card ("ID checker") can easily determine which assistance card 10 should be used to assist the ID checker in the analysis of an identification card 12 submitted by a patron. The state identifier 11 may include the name of the particular state that issued the card and/or the state flag of the particular state. In some embodiments of the invention, the ID checker has available a plurality of identification assistance cards where each identification assistance card represents, or is designed to be compatible with, an identification card issued by a particular state, jurisdiction, entity, etc. that distributes identification cards such as drivers licenses and passports. In some applications, the assistance cards available are only those corresponding to geographically proximate states. For example, in eastern Tennessee, an ID checker may have a group of assistance cards including the following states nearby to eastern Tennessee: North Carolina, South Carolina, Georgia, Kentucky and Virginia, in addition to a Tennessee assistance card 10. The assistance card 10 in the embodiment shown in FIGS. 1-4 also includes a supplemental reminder 13 that reminds the ID checker to consult an identification card book if a license for a state or territory other than Tennessee is submitted. Likewise, if the ID checker is located in another state or territory, such as Washington state, the supplemental reminder 13 reminds the ID checker to consult an identification card book if a license other than a Washington state license is submitted. The supplemental reminder 13, in embodiments where the ID checker has various other state assistance cards 10 at his disposal, may properly refer the ID checker to the other assistance cards 10.

Figure 3:
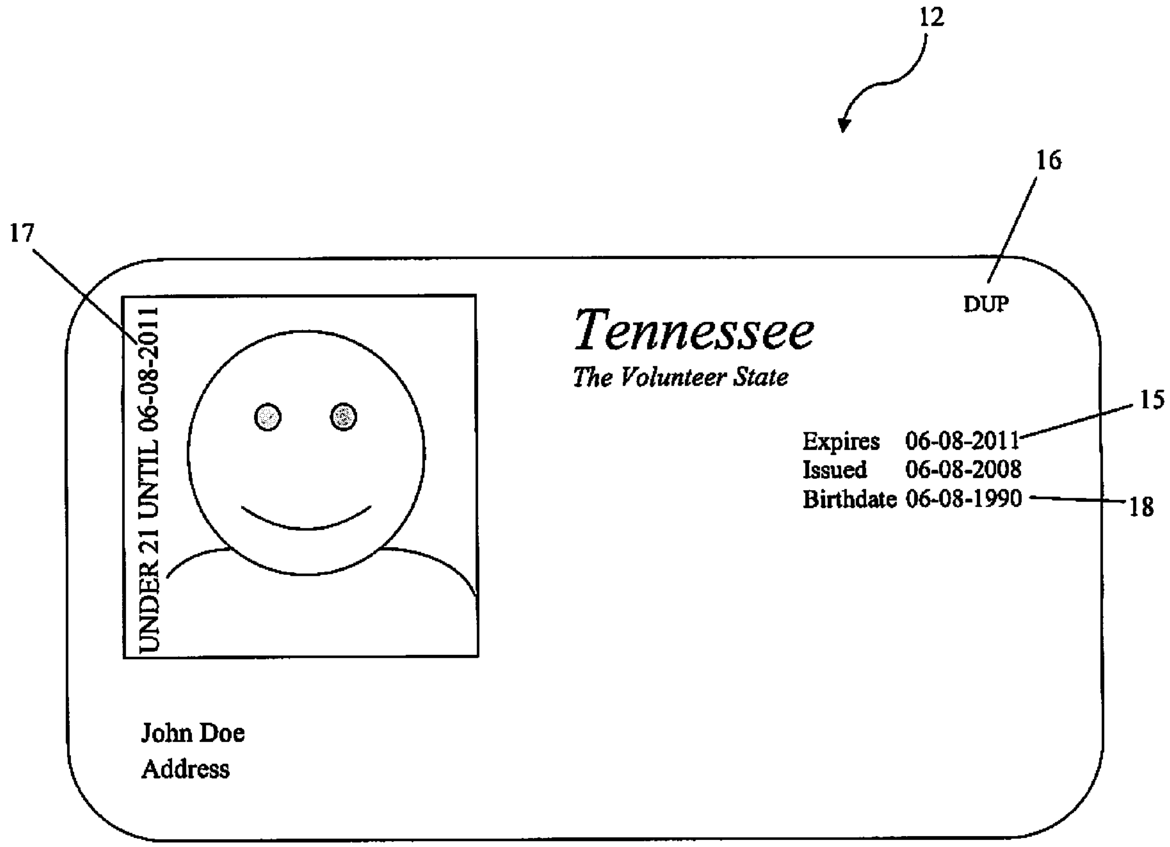
FIG. 3 is a representative figure of a Tennessee issued identification card.
Figure 4:
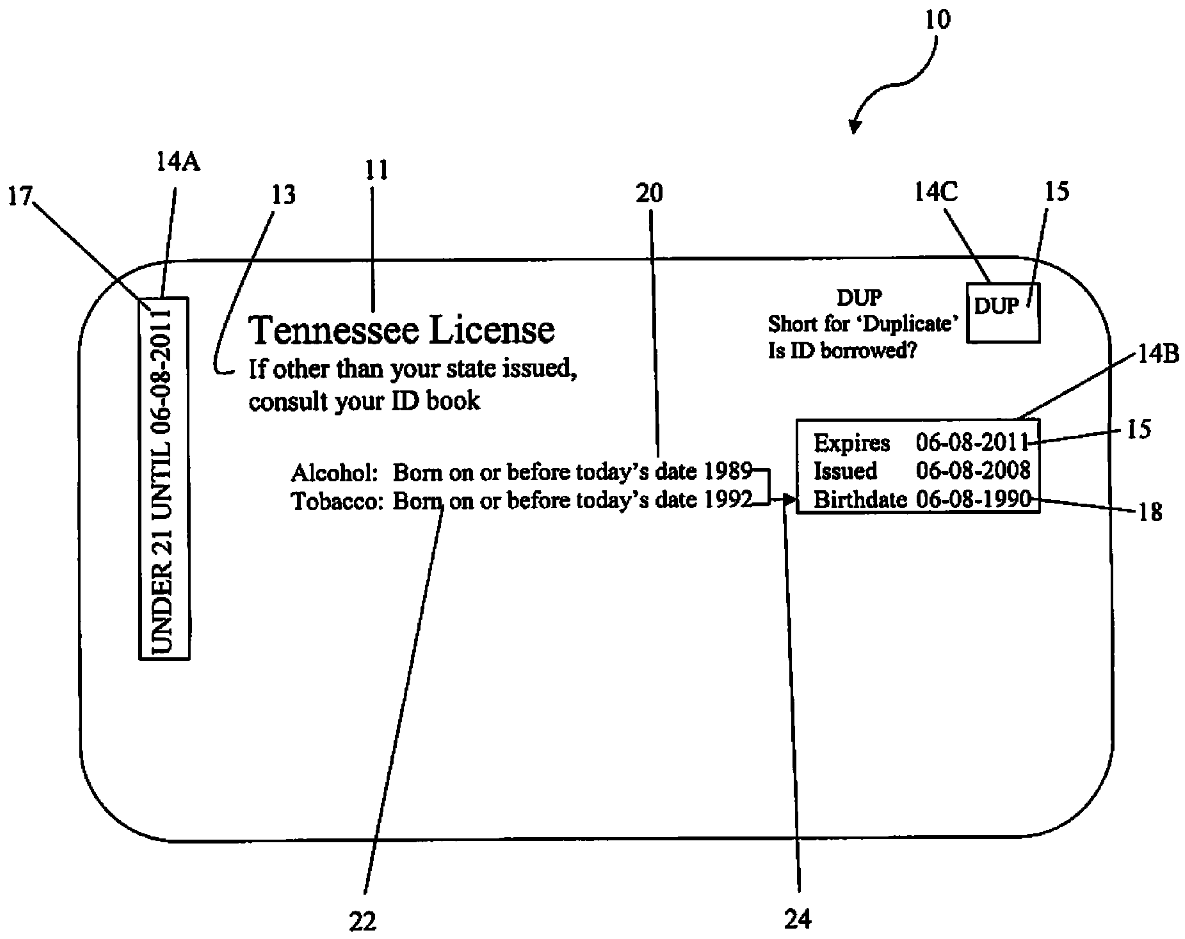
FIG. 4 is a representative figure of an identification assistance card coupled with the identification card of FIG. 3 such that the windows of the assistance card reveal the most relevant information of the identification card.

In one application the assistance card 10 provides assistance to an ID checker, such as a bartender, who is checking a patron's identification card 12 (see FIG. 3). The assistance card 10 defines one or more windows 14A, 14B and 14C cut from the card 10 from locations corresponding to the locations of the most relevant identification information printed on a typical identification card 12 such as a drivers' license. As shown in FIG. 3, relevant identification information may include such information as the expiration date 15 of the identification card 12, a duplicate indicator 16 identifying whether the identification card 12 is a duplicate, an underage identifier 17, and a birth date 18. The person checking the identification card 12 places the assistance card 10 over the top of the identification card 12 so that they are aligned properly. The assistance card 10 and identification card 12 are generally the same height and width such that the ID checker can easily couple the cards 10 and 12 so that they are substantially aligned. FIG. 4 illustrates use of the identification assistance card 10 that has been placed over the top of the identification card 12 of FIG. 3 such that the most relevant identification information on the identification card 12 is perceived through the windows 14 of the assistance card 10. In FIG. 4, the assistance card 10 represents the Tennessee-issued drivers' license as shown in FIG. 3. However, various embodiments of the assistance card 10 allow it to correspond to any state's drivers' license or other identification card 12.

In some embodiments of the invention, any assistance card 10 can be used to check the identification information by placing the one or more windows 14A, 14B and 14C over the information regardless of where it is located on the license. In this embodiment, the ID checker just has to align the windows 14 with the desired information without having to align the assistance card 10 with the identification card 12.

FIG. 1 shows an embodiment of the identification card 10 from its front side. The three identification information windows 14A-14C are cut from the card 10 to correspond with the most relevant identification information on a Tennessee driver's license 12. Window 14A corresponds to the underage identifier 17 that includes an "under 21 until MM/DD/YYYY" branding on the identification card 12. Window 14B corresponds to the location of several fields of the Tennessee driver's license 12. Specifically, window 14B corresponds with the expiration date 15 that includes the words "Expires MM/DD/YYYY", an issued field 19 including the words "Issued MM/DD/YYYY", and a birth date field 18 including the words "Birthdate MM/DD/YYYY". Printed on the assistance card 10 proximate window 14B, or proximate whichever window displays the birth date field 18, an age reminder or verbiage for assisting the ID checker in identifying a latest birth date for which a holder of the identification card 12 is allowed to perform the activity in which the ID checker is obtaining identification information for. As shown in FIGS. 1 and 4, the verbiage includes an alcohol reminder 20 that may state something similar to the following: "Alcohol: Born on or before today's date YYYY". The alcohol reminder 20 reminds the person checking the identification card 12 that a patron must have been born on or before today's date in a given year in order to legally purchase alcohol products. Similarly, the tobacco reminder 22 is printed proximate window 14B and includes something similar to the following words: "Tobacco: Born on or before today's date YYYY". The tobacco reminder 22, similar to the alcohol reminder 20, serves to remind the person checking the identification card 12 that a person must have been born on or before today's date in a given year in order to legally purchase tobacco products.

To help the person checking the identification card 12, a bracketed arrow 24 couples the alcohol reminder 20 and the tobacco reminder 22 together and indicates the relationship with window 14B.

Window 14C corresponds to the location of the duplicate indicator 16 of the Tennessee driver's license 12. If the driver's license has been duplicated, such as because of a "lost" license, the new, duplicate license will indicate this by printing the duplicate indicator 16, which includes the letters "DUP". Associated with the third window 14C is the duplicate reminder including the words "DUP Short for 'Duplicate'. Is ID borrowed?", which reminds the ID checker to take special care in inspecting the identification card 12 if the letters "DUP" are printed on the card 12. This may indicate that a license of a sibling or friend was reported "lost" so that the issued duplicate could be used by someone other than the person identified by the card 12.

Referring now to FIG. 2, the back of the assistance card 10 is shown. The back includes the codes of carding field 30 including a header 30A having the words "Know the C.O.D.E.S. of Carding". "C.O.D.E.S." is an acronym useful for effectively checking identification cards 12 for authenticity and appropriate age. The codes of carding field 30 includes the following five codes: Condition, Ownership, Date of Birth, Expiration Date, and Security Features and Signature. The codes of carding field 30 also includes the manager reminder including the words "If there is any question, get a manager." The manager reminder, of course, reminds the ID checker to get a manager if the ID checker has any question whether the identification card 12 presented by a patron is authentic or satisfies the age requirements for the intended purchase or activity.

The identification assistance card 10 is made from laminated card stock in some embodiments and in others it is printed on credit card type plastics.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An identification assistance card system for assisting an identification checker in determining whether a holder of an identification card having identification information and an identification card shape is allowed to perform an activity, the identification assistance card system comprising:

an identification assistance card having an assistance card shape substantially the same as the identification card shape of the identification card for assisting the identification checker in substantially aligning the identification assistance card with the identification card; and an identification information window disposed in the identification assistance card for displaying the identification information from the identification card to the identification checker when the identification assistance card is substantially aligned with the identification card, the identification information window being disposed in the identification assistance card at a location based at least in part on where the identification information is disposed on the identification card, the identification checker using the identification information displayed in the identification information window to determine whether the holder of the identification card is allowed to perform the activity.

2. The identification assistance card system of claim 1 wherein the identification information includes a birth date of the holder of the identification card.

3. The identification assistance card system of claim 2 further comprising an age reminder disposed on the identification assistance card adjacent the identification information window for assisting in identifying a latest birth date for which the holder of the identification card is allowed to perform the activity.

4. The identification assistance card system of claim 3 wherein the activity includes purchasing at least one of alcohol and tobacco.

5. The identification assistance card system of claim 1 further comprising a second identification information window disposed in the identification assistance card for displaying the identification information from the identification card, the second identification information window being disposed in the identification assistance card at a second location based at least in part on where the identification information displayed by the second identification information window is disposed on the identification card.

6. The identification assistance card system of claim 1 wherein the identification assistance card includes a first identification information window and a second identification information window and the identification information includes a birth date of the holder of the identification card and an expiration date of the identification card, the first identification information window for displaying the birth date of the holder of the identification card and the second information window for displaying the expiration date of the identification card.

7. The identification assistance card system of claim 1 wherein the identification assistance card includes a first identification information window and a second identification information window and the identification information includes a birth date of the holder of the identification card and a duplicate indicator identifying whether the identification card is a duplicate, the first identification information window for displaying the birth date of the holder of the identification card and the second information window for displaying the duplicate indicator.

8. The identification assistance card system of claim 1 further comprising a plurality of identification assistance cards each representing identification cards issued by at least one of a plurality of states, the plurality of identification assistance cards each having an identification information window disposed in the identification assistance card at a location based at least in part on where identification information is disposed on identification cards issued by at least one of the plurality of states.

9. An identification assistance card system for assisting an identification checker in determining whether a holder of an identification card having identification information including a birth date of a holder of an identification card and having an identification card shape is allowed to purchase at least one of alcohol and tobacco, the identification assistance card system comprising:

a plurality of identification assistance cards each representing the identification card issued by at least one of a plurality of states, the plurality of identification assistance cards each having an assistance card shape substantially the same as the identification card shape of the identification card that the identification assistance card represents for assisting the identification checker in substantially aligning the identification assistance card with the identification card;

an identification information window disposed in each of the plurality of identification assistance cards for displaying to the identification checker the birth date of the holder of the identification card when the identification assistance card is substantially aligned with the identification card that the assistance card represents; and an age reminder disposed on each of the plurality of identification assistance cards adjacent the identification information window for assisting in identifying a latest birth date for which the holder of the identification card is allowed to purchase at least one of alcohol and tobacco, the identification checker using the identification information displayed in the identification information window to determine whether the holder of the identification card is allowed to purchase at least one of alcohol and tobacco.

10. The identification assistance card system of claim 9 wherein the identification information further includes at least one of an expiration date of the identification card, a duplicate indicator identifying whether the identification card is a duplicate, and an underage identifier, and the identification assistance card further comprises a second identification information window disposed in each of the plurality of identification assistance cards for displaying at least one of the expiration date, the duplicate indicator, and the underage identifier from the identification card.

11. A method for determining whether a holder of an identification card having identification information and an identification card shape is allowed to perform an activity, the method comprising:

providing an identification assistance card having an assistance card shape based at least in part on the identification card shape of the identification card and an identification information window disposed in the identification assistance card for displaying the identification information, the identification information window being disposed in the identification assistance card at a location based at least in part on where the identification information is disposed on the identification card;

aligning the identification assistance card with the identification card so that the identification information window displays the identification information from the identification card; and obtaining the identification information displayed in the identification information window to determine whether the holder of the identification card is allowed to perform the activity.

12. The method of claim 11 wherein the identification information includes a birth date of the holder of the identification card.

13. The method of claim 12 wherein the activity includes purchasing at least one of alcohol and tobacco.

14. The method of claim 11 further comprising providing a plurality of identification assistance cards each representing identification cards issued by at least one of a plurality of states and wherein the identification information window of each of the plurality of identification assistance cards is disposed in the identification assistance card at the location based at least in part on where the identification information is disposed on identification cards issued by one of the plurality of states.

15. The method of claim 14 further comprising choosing an appropriate identification assistance card from the plurality of identification assistance cards based at least in part on which state issued the identification card of the holder.

* * * * *